Nov. 22, 1932.  C. H. NIXON  1,888,563
INSECT TRAP
Filed Dec. 10, 1928    2 Sheets-Sheet 1
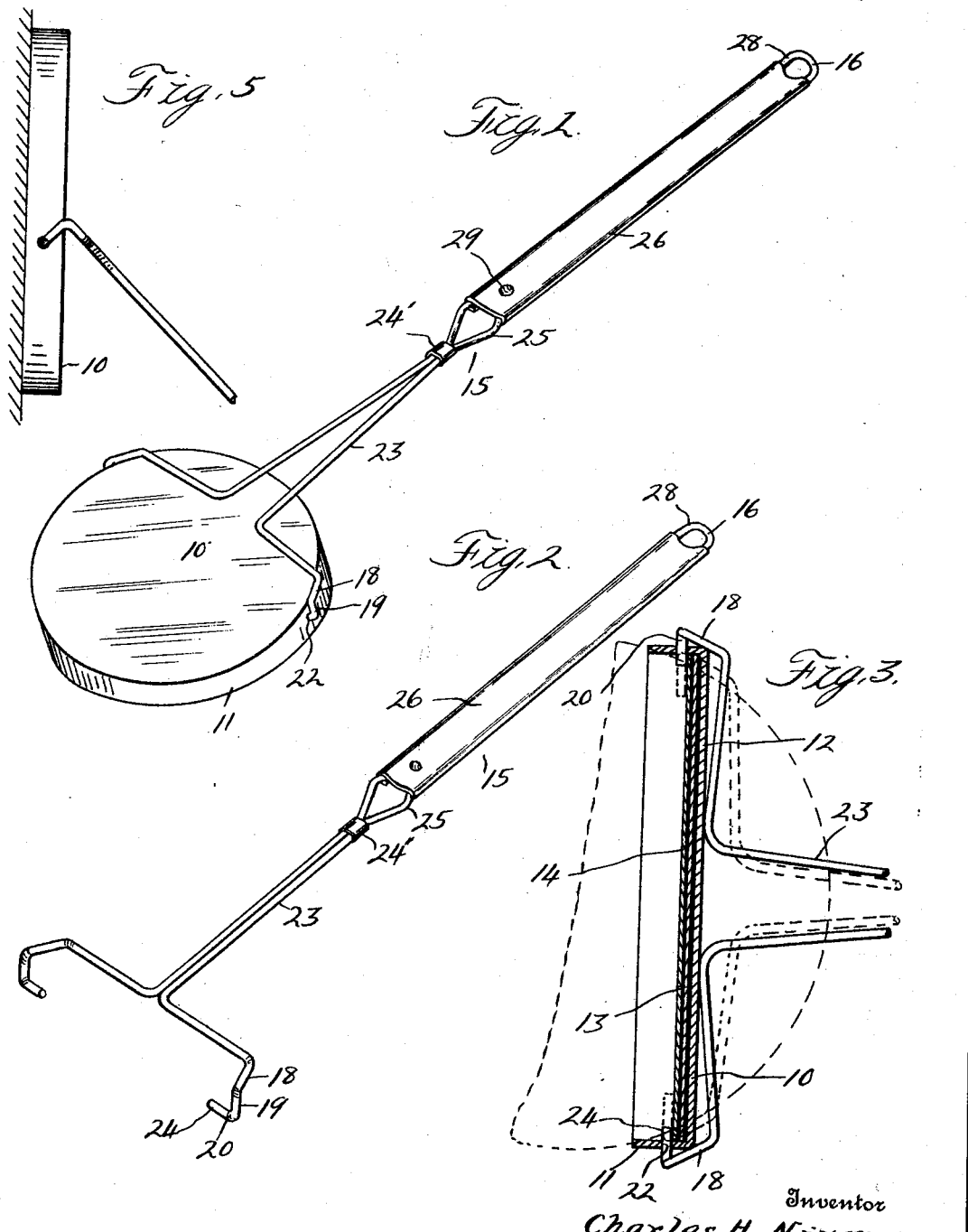
Inventor
Charles H. Nixon Nov. 22, 1932.  C. H. NIXON  1,888,563
INSECT TRAP
Filed Dec. 10, 1928    2 Sheets-Sheet 2
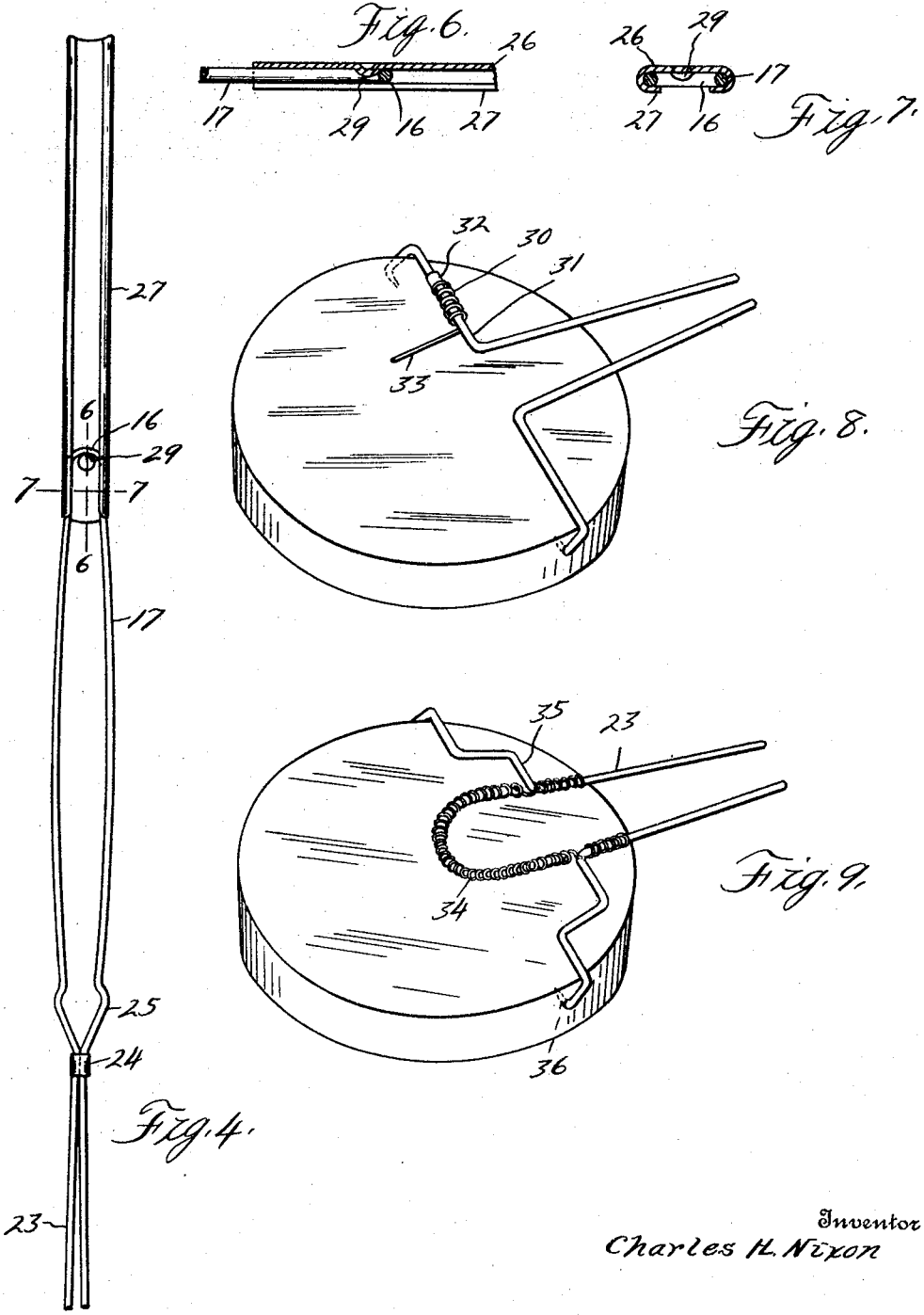

Patented Nov. 22, 1932

1,888,563

UNITED STATES PATENT OFFICE

CHARLES H. NIXON, OF DETROIT, MICHIGAN

INSECT TRAP

Application filed December 10, 1928. Serial No. 325,078.

This invention relates to insect traps and more particularly to an improved fly catcher.

It is one of the primary objects of this invention to provide an extensible handle for the trap having a portion pivotally connected to the latter and operable to automatically align the trap with the surface with which it is to be engaged and further to automatically return the trap to its normal or original position when disengaged from the surface.

Other objects and advantages of this invention are attributed to the peculiar construction of the handle portion and the manner in which the same cooperates with the trap or container to perform the foregoing functions. These advantages and structural details will be made more apparent as this description proceeds, especially when considered in connection with the accompanying drawings, wherein:

Figure 1 is a perspective view illustrating my improved fly catcher;

Figure 2 is a view similar to Figure 1 showing the handle prior to engaging the trap;

Figure 3 is a sectional view showing the trap in various positions;

Figure 4 is a fragmentary view showing the handle in extended position;

Figure 5 is a detail view illustrating one position of the trap;

Figure 6 is a sectional view taken on the plane indicated by the line 6—6 on Figure 4;

Figure 7 is a sectional view taken on the plane indicated by the line 7—7 on Figure 4;

Figures 8 and 9 are perspective views illustrating a slightly modified form of construction.

Referring now to the drawings, it will be noted that there is illustrated a trap 10, which is preferably in the form of a cylindrical container having an annular flange 11. The latter is preferably formed of relatively pliable material so that it will not mar the surface with which it is engaged. The inner surface of the bottom 12 of the container is coated with an entangling preparation capable of holding flies or other insects in the container after the same have been trapped. If desired, a plurality of sheets of material 13 coated with a similar material may be placed in superposed relation upon the bottom 12. With this arrangement, the container may be used a comparatively long time depending upon the number of applications 13 placed therein. The applications 13 as will be apparent from the drawing, may be readily detached from the container and are preferably concealed and protected by a suitable cover 14.

For manipulating the container, I provide a suitable handle 15, preferably formed of a single strand of wire looped as at 16 to form a double strand constituting the shank portion 17. The free ends of the wire are bent in opposite directions at right angles to the shank portion 17 and subsequently flared outwardly as indicated at 18. The flared portions 18 preferably terminate in upwardly extending portions 19, which in turn are bent inwardly as at 20 to form pintles 24. The latter are adapted to engage in aligned apertures 22 formed in the annular flange 11 at a point offset from the center of the container. The upper part of the double stranded shank portion 17 designated at 23 is tied together by means of a suitable clip 24'. The arrangement being that when the container is assembled upon the handle, the strands 23 are sprung outwardly from the clip 24', thereby placing the strands under tension. Immediately below the clip 24' the handle is bulged outwardly as indicated at 25, constituting a stop for a slidable extension 26. In order to provide a slidable and inter-locking connection between the handle and extension, the longitudinal edges of the latter are crimped over the wire as indicated at 27. The wire being spread outwardly prior to placing the extension thereon so that a resistance is offered to the sliding of the extension, thereby preventing the latter from accidental movement relative to the handle in any of its adjusted positions. As will be apparent from the drawings, when the extension is in engagement with the bulge 25 a portion 28 of the end of the handle is exposed, thus providing a convenient means for hanging the device upon a hook when not in use. The extension 26 is provided with a projection 29 adjacent the inner end thereof adapted to engage the end of the loop 16 in the extended position of the handle and prevent the extension from being detached from the device.

With the device as described, it will be noted that in the event the outer edge of the flange 11 strikes the surface first, the container will immediately pivot about the pintles 24 and assume a position wherein the entire area of the edge of the annular flange 11 contacts with the surface. This is by reason of the fact that the pintles 24 engage the flange a substantial distance inwardly from the center of the container. When the container is moved out of its normal plane to align itself with the surface to be engaged the bottom edge thereof adjacent the apertures 22 engages the outwardly flared portions 18 and as a consequence forces the strands 23 outwardly from the clip 24'. With this arrangement when the container is retracted from the surface, the strands, in their effort to assume their original or normal position move the flared portions 18 inwardly and owing to the fact that the latter are flared outwardly the bottom of the container is forced out of engagement with the flared portions and the container assumes its normal position.

Referring now to the modified forms of handles illustrated in Figures 8 and 9, it will be noted that the only material difference between these forms and the previous described form is that the flared portions 18 are eliminated, and yieldable means is employed for positively returning the container to its normal position. In the construction illustrated in Figure 8 a coil spring 30 is placed around one of the lateral extensions 31 of the handle with one end of the spring permanently secured to the extension as at 32 and the opposite end 33 engaging the bottom of the container. The operation of this form of the invention is no doubt obvious as when the container is tilted out of its normal plane, the spring 30 will be placed under tension so that upon releasing the pressure upon the container, the same will instantaneously return to its normal position.

In Figure 9 the same results are accomplished by placing the opposite ends of a coil spring 34 upon the strands 23 with the intermediate portion 35 thereof bent upwardly so as to engage the bottom of the container at a point above the pintles 36, thereby exerting a force upon the latter tending to maintain the same in its normal position.

Thus from the foregoing, it will be apparent that I have provided a relatively simple fly trap equipped with a handle capable of supporting the trap in such a manner that it will align itself upon contacting with a surface and will automatically move to its original position upon being moved out of contact with the surface.

What I claim as my invention is:

1. In an insect destroyer, a handle, an insect destroying member having a pivotal connection with said handle permitting the member to align itself with the surface to be engaged, yieldable means mounted upon said handle and engageable with the base of said destroying member to automatically move the latter to its normal position.

2. In an insect destroyer, a handle, an annular insect destroying member pivotally mounted upon said handle and movable relative thereto to align itself with the surface to be engaged, means comprising a spring member having its ends secured to said handle and having a portion intermediate the ends thereof engageable with the bottom of the container at a point beyond the pivotal connection between the handle and container for automatically returning the same to its normal position.

3. In an insect destroyer, a handle, an insect destroying member arranged in predetermined position with respect to the handle and having a pivotal connection with the latter permitting the member to align itself with the surface to be engaged thereby, and means on said handle and engageable with said member tending to urge the latter to the aforesaid predetermined position thereof.

In testimony whereof I affix my signature.

CHARLES H. NIXON.